Figure 1:
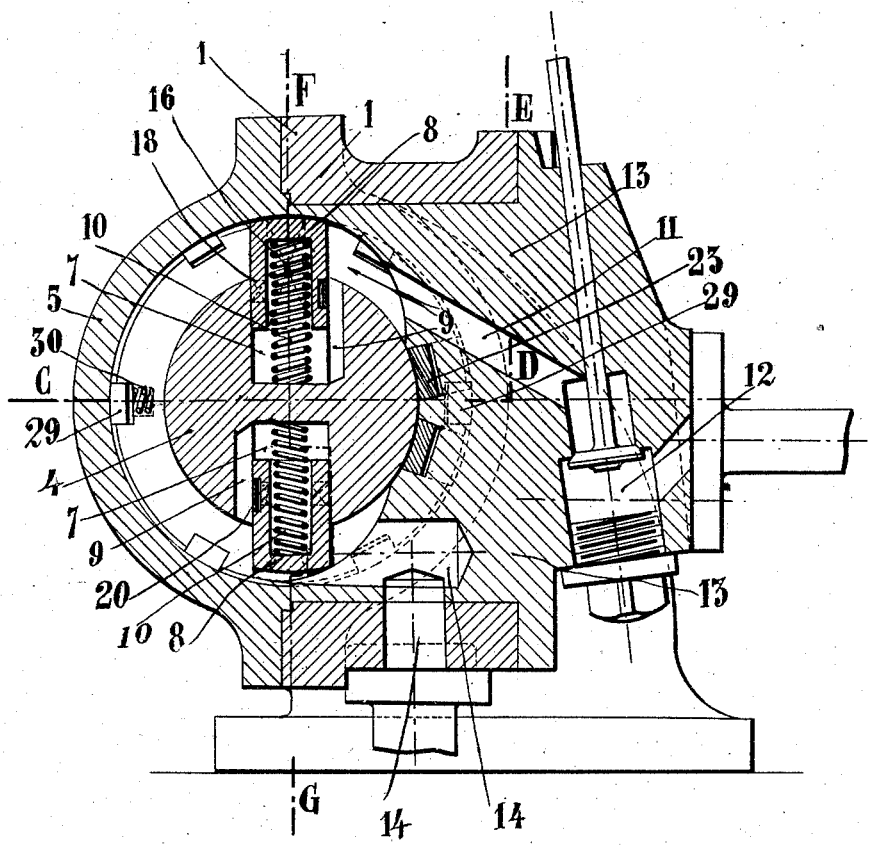

M. NAËDER.
ROTARY MOTOR.
APPLICATION FILED FEB. 3, 1908.

928,270.

Patented July 20, 1909.
7 SHEETS—SHEET 1.

M. NAËDER.
ROTARY MOTOR.
APPLICATION FILED FEB. 3, 1908.
928,270.
Patented July 20, 1909.
7 SHEETS—SHEET 2.
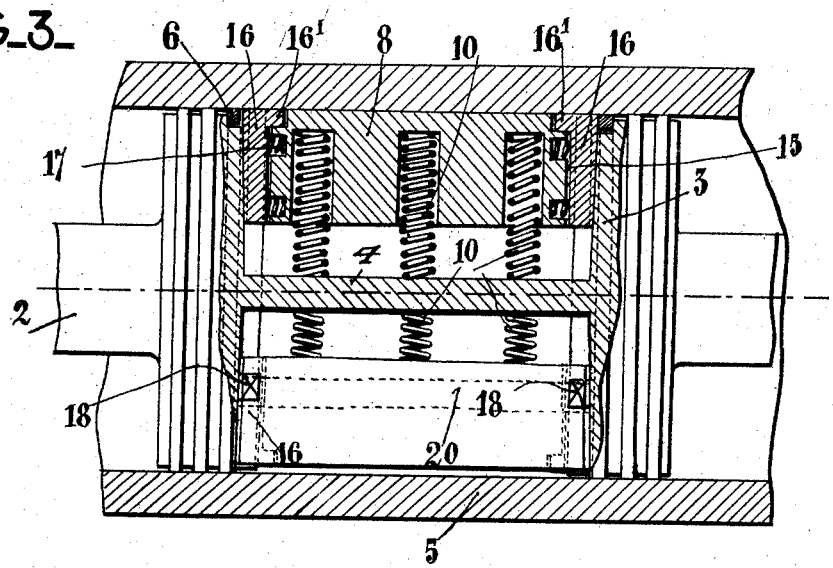
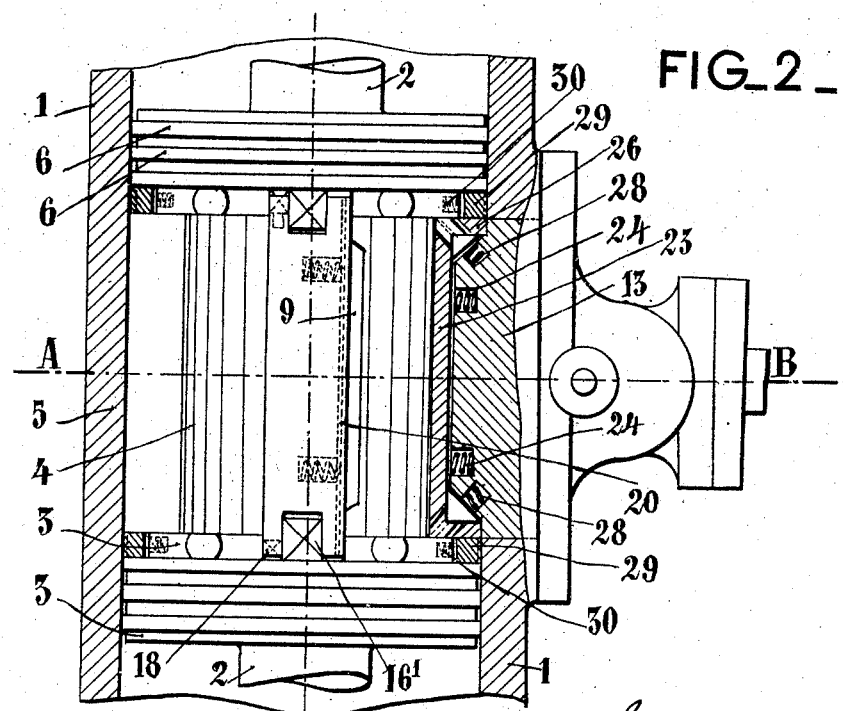

M. NAËDER.
ROTARY MOTOR.
APPLICATION FILED FEB. 3, 1908.
928,270.
Patented July 20, 1909.
7 SHEETS—SHEET 3.
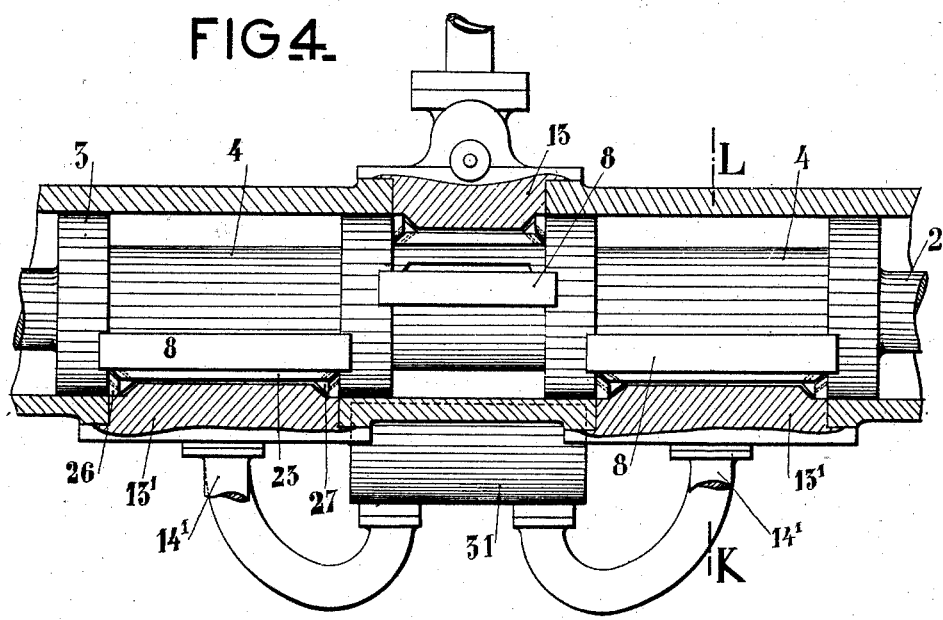
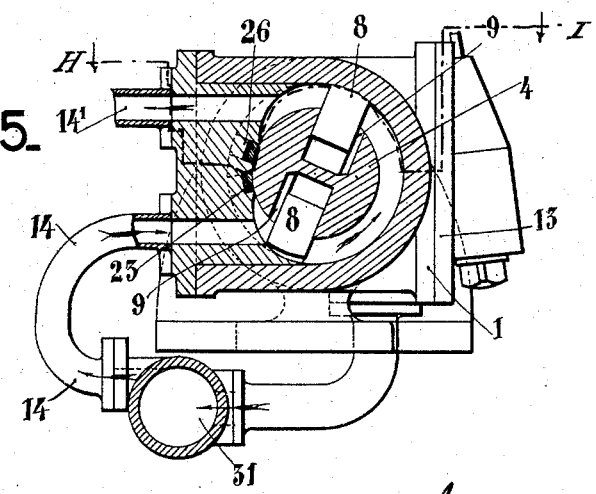

FIG_6_
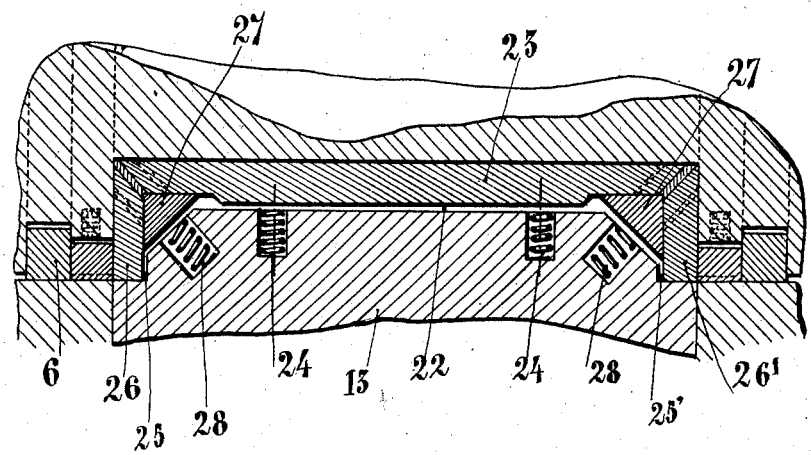
FIG_7_
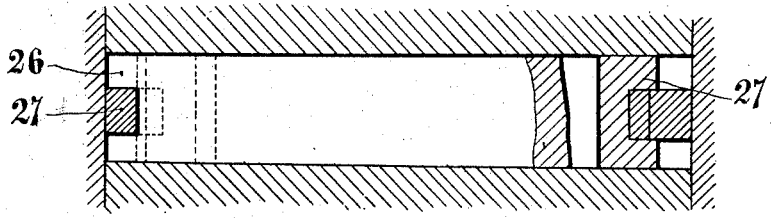

M. NAËDER.
ROTARY MOTOR.
APPLICATION FILED FEB. 3, 1908.
928,270.
Patented July 20, 1909.
7 SHEETS—SHEET 5.
FIG_8_
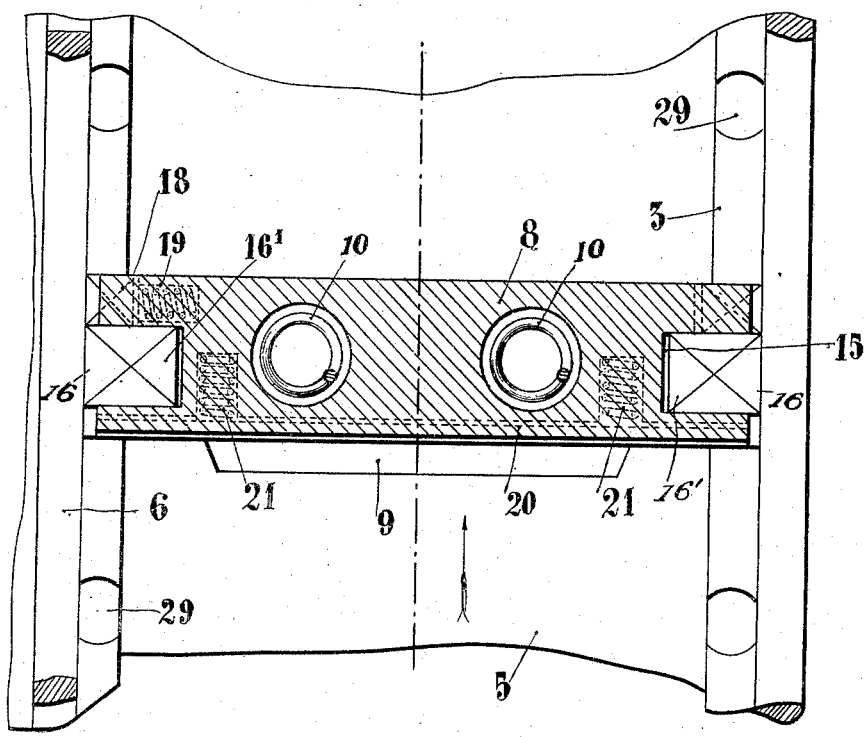

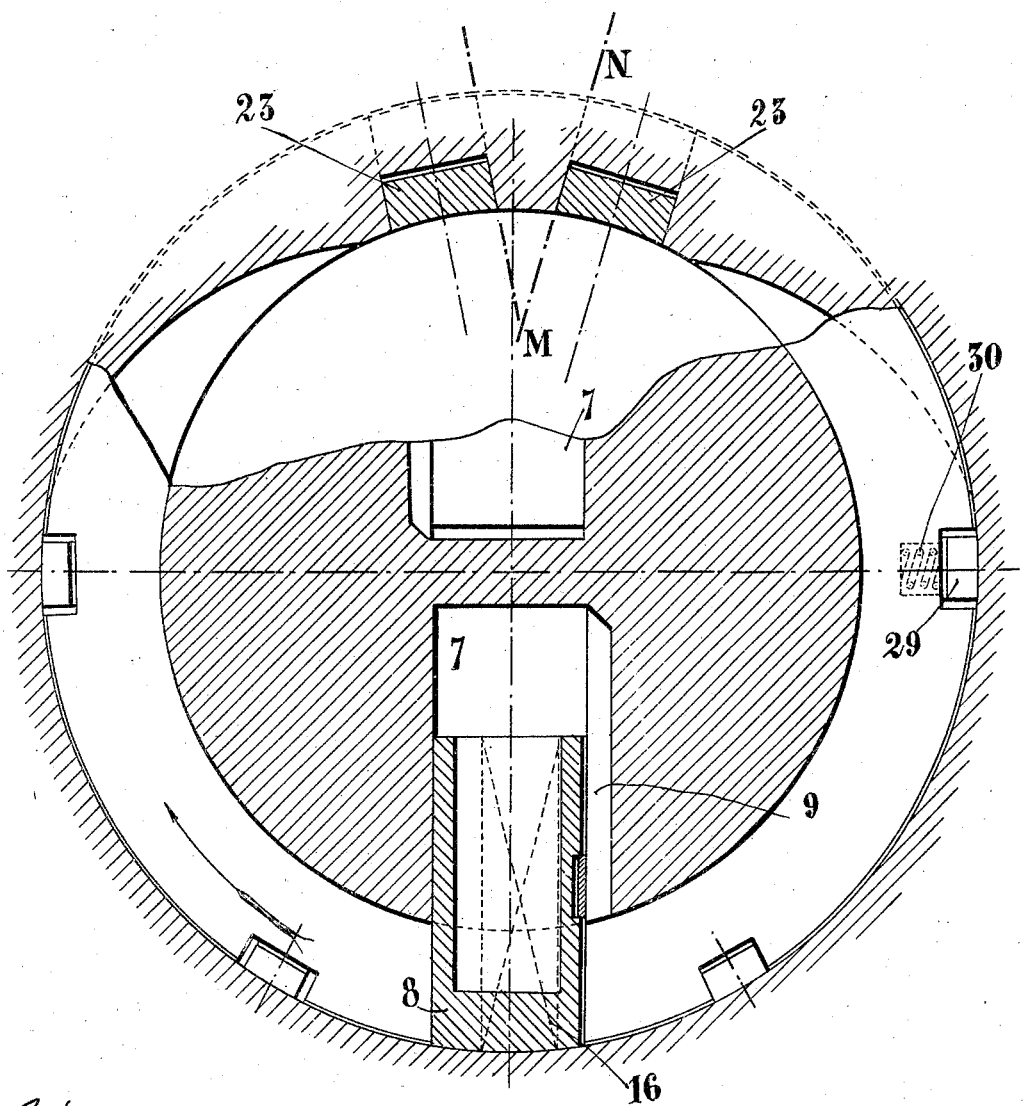

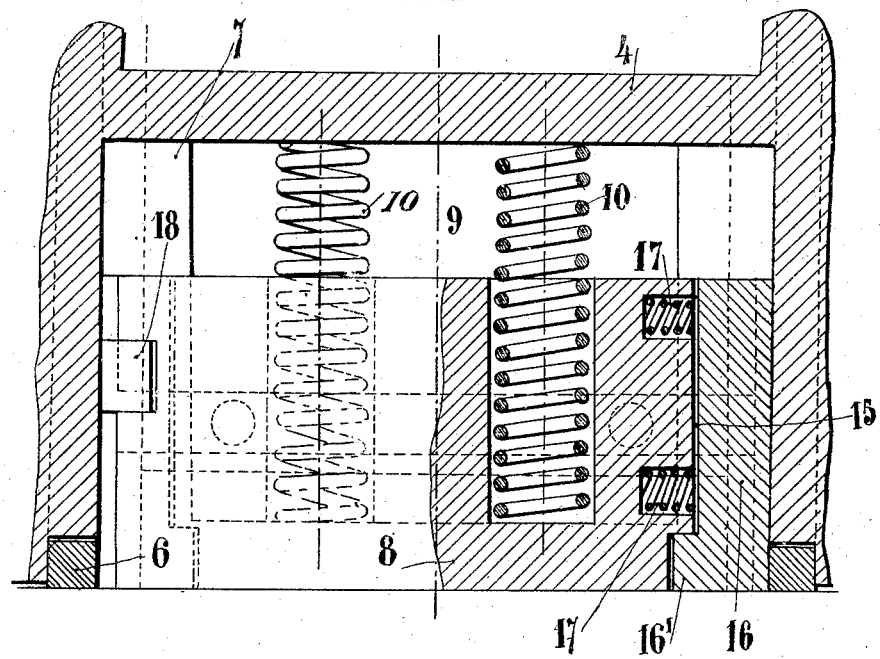

UNITED STATES PATENT OFFICE.

MAURICE NAËDER, OF SAINT GERMAIN-LEZ-CORBEIL, NEAR CORBEIL, FRANCE.

ROTARY MOTOR.

No. 928,270.　　　　Specification of Letters Patent.　　　Patented July 20, 1909.

Application filed February 3, 1908. Serial No. 414,143.

*To all whom it may concern:*

Be it known that I, MAURICE NAËDER, a citizen of the Republic of France, residing at La Montagne Saint-Germain, Saint Germain-lez - Corbeil, near Corbeil, Seine - et - Oise, France, have invented Improvements in Rotary Motors, of which the following is a specification.

This invention has for object to provide a simple and efficient rotary motor capable of acting either as a pump or a compressor and comprising means coöperating to render fluid tight the chambers in which the motive fluid works; the improved motor being of small bulk relatively to its power.

The accompanying drawings illustrate by way of example a construction of rotary motor embodying this invention.

Figure 1 shows the motor in transverse section corresponding to the line A—B of Fig. 2. Fig. 2 shows one section or element of the motor partly in plan and partly in horizontal section corresponding to the line C—D—E of Fig. 1. Fig. 3 is a vertical sectional view of the motor cylinder following the broken line F—G, Fig. 1. Fig. 4 is a diagrammatic view, partly in horizontal section corresponding to the line H—I of Fig. 5 and partly in plan illustrating a motor comprising several sections or elements combined on the compound principle, that is to say, so arranged as to utilize the expansion of motive fluid such as steam, in several cylinders. Fig. 5 is a diagrammatic transverse section corresponding to the line K—L of Fig. 4. Fig. 6 is a broken detail view in longitudinal section through one of the packing bars 23. Fig. 7 is a plan view of Fig. 6 with certain parts removed and others broken away. Fig. 8 shows the upper portion of one of the piston blades and adjacent parts, also on a larger scale. Fig. 9 is a vertical transverse section, on an enlarged scale, through a working chamber of the motor. Fig. 10 is a detail view, showing one of the piston blades and adjacent parts partly in elevation and partly in vertical longitudinal section.

As will be seen the motor illustrated comprises a cylindrical casing 1, within which is concentrically arranged a shaft 2 mounted to rotate in suitable bearings and which is formed or provided with two or more collars or piston like enlargements or partitions 3 adapted to fit the casing 1 and between which the shaft 2 constitutes a piston carrying drum 4 which extends from one partition 3 to the other thereby forming one or more annular chambers 5 which are separated in a fluid tight manner by packing rings or segments 6 with which each partition or end wall 3 is provided; each chamber 5 comprising with its inclosed parts one section or element of the motor.

Each drum like body 4 is formed with one or more recesses 7; in the example illustrated, there are two such recesses in each body 4. Extensions of these recesses are formed in the end walls or partitions 3 for such a depth that the base of each such recess extension is almost flush with the inner face of the adjacent packing ring or segments 6, see Fig. 3. These recesses are adapted to form seatings or guides for the inner portions and ends of piston blades 8 upon which the motive fluid acts.

As will be seen the seatings or guides constituted by the recesses 7 are separated from each other by a wall of metal comprised in the mass of the drum-like body 4 thereby insuring between adjacent recesses a fluid-tightness which is complete and indispensable; furthermore, as this thick metal partition is a part of the drum itself and not a metal partition formed by or in an auxiliary sleeve keyed upon the shaft, the diameter of the drum-like body 4 may be less for a certain section of the piston blade than would be the case if such a sleeve were employed; the bulk of the machine for a given power can therefore be reduced.

The piston blades are constantly pressed outwardly toward the internal face of the casing 1 by motive fluid under pressure passing under their inner faces through wide ports or passages 9 and expanding between the piston blades and the drum like bodies 4 over the entire areas of the inner faces of such piston blades; the arrangement is such that steam, for example admitted to the working chamber acts instantaneously and at full pressure upon the inner faces of the blades and consequently forces the outer faces of such piston blades against the surrounding wall of the casing before it has had time to pass between the outer faces of such blades and such wall and thereby push the blades farther into their recesses 7 against the action of springs 10 which are intended to assist the steam acting in the way described.

The shaft 2, the end walls or partitions 3, and the drum-like bodies 4 may be in a single piece or consist of several pieces connected in an absolutely rigid manner, and the whole constitutes with the piston blades 8 the movable part of the motor which part, under the action of steam bearing upon the piston blades 8, rotates with a uniform movement in appropriate bearings.

Steam under pressure, for example, enters the working chamber 5 by an admission passage 11 formed in a solid part or boss 13 formed in one with or connected to the casing 1 and which is controlled by any suitable distributing device at 12, such as a lift valve, slide valve, or piston valve, with variable expansion or not, regulated by a governor. The boss 13 projects into the chamber 5 and bears against the drum-like body 4 thereby forming a wall or partition that blocks the chamber 5 at that part; the portions of the boss 13 extending from such wall or partition to the cylindrical wall of the casing 1 are of long, flat curvature so as to form an easy path for the outer faces of the piston blades 8 An exhaust passage 14 formed in the lower part of the boss 13 communicates with the atmosphere, or with a condenser, or similar apparatus or, by passing into an intermediate reservoir, with other working chambers 5, in the case of a compound arrangement. It will be seen therefore that if fluid, for example steam, under pressure be admitted to the passage 11 it will act successively against each piston blade 8 to cause the movable structure to turn and also pass through the ports 9 under the blades 8 to press them strongly against the wall of the casing 1. At each revolution each piston blade 8 will uncover the exhaust 14, will be thrust inwardly completely into its recess 7 by the boss 13 and will afterward emerge therefrom, first under the action of the springs 10, then under the more powerful and instantaneous action of the steam or other fluid issuing from the passage 11; a fresh impulse will therefore be given to the rotary movement, and so on.

Packing devices which will now be described render the general mechanism hereinbefore described efficient.

If a rotary engine is to be efficient it is necessary that the motive fluid shall not escape at any point from the space or chamber in which it works. In the casing which contributes to form this space or chamber the surfaces forming the ends of the chamber have to be considered as well as the casing itself. As has been hereinbefore described fluid tightness is assured in the improved motor by constituting the end walls as circular plates or partitions 3 formed like steam engine pistons and packed with a series of rings or segments 6. Such partitions, which are mounted upon the shaft or form parts thereof, work, under the best conditions for maintaining fluid tightness as they rotate within the casing while remaining constantly in contact with the internal surface thereof.

In the second place it is necessary to insure fluid tightness of the working faces of the movable propulsive elements, constituted in the present case by the piston blades 8. The means for maintaining fluid tightness at the outer faces of the blades 8 which bear upon the casing 1 have hereinbefore been described so that it only remains to describe the means employed for preventing escape of fluid at the ends of the blades. It will be seen that the construction is such that the blade ends are juxtaposed to parts of the motor which are carried around with the blades in the same movement of rotation so that the movements of these ends are of small amplitude with respect to the parts against which they abut and only the to and fro movements as they enter and leave their recesses 7 need be considered, such to and fro movements being caused by the outer face of the blades moving at a high speed against a fixed part. The joints between the blade ends and the juxtaposed parts of the engine may therefore be made fluid tight under favorable conditions. For this purpose in each end of each blade 8 is formed a groove 15, (see Fig. 10) which extends the full depth of the blade and into which fits a packing piece or strip 16 of antifriction or any other convenient metal. The outer face of each packing piece or strip is shown in Fig. 3 as slightly inclined so as to bear upon the correspondingly inclined end of the recess 7 on which it works. Springs 17 placed in suitable recesses formed in the blade 8 constantly press the strips 16 against the ends of the recesses 7, see Figs. 8 and 10. The ends of the recesses are however preferably made parallel to the plane of the partitions 3 in which they are formed.

The strips 16 move in and out with the corresponding piston blades 8 to which they are connected by lugs $16^1$, and at the moment of steam or other motive fluid admission they are powerfully pressed against the partitions 3 by the fluid under pressure filling the recesses 7 as hereinbefore explained for outwardly moving the piston blades 8. To prevent the motive fluid that passes behind the strips 16 from passing to the outer side of the piston blade through the channels then existing on the side opposite to the inlet of the fluid and bounded by the strips 16, the ends of the blades 8 and partitions 3, see Fig. 8, there is arranged in each of these channels a small plate 18 that moves with the corresponding piston blade 8 and is pressed against the end of the corresponding recess 7 by a spring 19 arranged in a recess in the piston blade 8 into which the steam under pressure can enter. In this way the ends of the piston blades are made perfectly tight and economical working is facilitated.

20 are longitudinal bars arranged in grooves in the front faces of the piston blades 8 parallel to the upper faces thereof and located within the recesses 7. Springs 21, Fig. 8, constantly tend to force these bars away from the blades and so avoid any possibility of the piston blades not bearing against the rear walls of their recesses at starting; in this way motive fluid is prevented from passing the piston blades and escaping to the other side thereof.

It will be seen that the bars 20 are only arranged on those sides of the piston blades where fluid tightness is not sought and they act on the opposite sides thereof by transmitting to the piston blades in the direction of the thrust of the motive fluid the pressure of the springs 21 to which they serve as abutments and which are adapted to keep the front face of the piston blades constantly held against the corresponding walls of their recesses in the drum-like body 4.

In the third place it is necessary to insure fluid tightness between the partition separating the exhaust from the admission and the drum-like body 4. For this purpose longitudinal and lateral grooves 22, 25 and $25^1$, see Figs. 6 and 7, are formed in the boss 13, each set of grooves serving as seats for three packing bars 23, 26, $26^1$ respectively, arranged at right angles to one another and connected at the corners by tenon wedges 27; the inner face of the bar 23 is curved to fit the drum-like body 4 upon which it is caused to bear by springs 24. The two grooves 25, $25^1$ extend radially and serve as seatings for the small bars 26, $26^1$. The wedges 27 are acted upon by springs 28 and arranged to close the joints between the bar 23 and the small bars 26'. It will be understood that this arrangement of packing bars or strips 23, 26, $26^1$, 16, $16^1$ act after the manner of packing rings in the piston of a steam engine and effectively prevent motive fluid passing directly into the exhaust passage from the admission passage. The action of the springs 24 and 28 is completed and rendered effective by the pressure of motive fluid behind the bars 23 which enters by orifices formed in the metal of the boss 13 and not shown in the drawing. Finally, to close the annular space otherwise left by the clearance between the partitions 3 and the surrounding casing 1 from the inner faces of these partitions to the first adjacent packing rings or segments thereof bearing or rubbing blocks 29 are provided which are pushed against the wall of the casing by springs 30 located in suitable recesses formed at intervals in the rotary partition 3. The blocks 29 are formed of antifriction or other suitable material and are distributed in such a way that during the rotation of the partitions 3 there is always a block 29 on each side of the boss 13 between the admission and the exhaust passages and opposite one or other of the bars 26, $26^1$.

The whole of the mechanism hereinbefore described as arranged for one motor section or element such as shown in Figs. 1, 2 and 3, will be obviously repeated in the case of a number of elements arranged in line. By way of example Figs. 4 and 5 illustrate a motor in which the movable part comprises three rotary elements arranged in three cylindrical chambers. They are connected in compound, that is to say in such a way as to utilize the successive expansion of the motive fluid, the first admission taking place in the middle section through the boss 13, this section then exhausts into the intermediate reservoir 31 from which it is distributed into the two other sections by pipes 14. The final exhaust is through pipes 14. As in such arrangement the boss 13 for high pressure steam is provided with a distributing device it is obviously unnecessary to provide the bosses $13^1$ of the two other elements with such devices.

What I claim is:—

1. In a rotary motor, a cylindrical casing a rotary shaft extending centrally through said casing, a drum-like body formed with recesses carried by said shaft within said casing and concentrically arranged in relation to said shaft, piston like collars or partitions on said shaft adapted to form the ends of the annular chamber formed between said body and said casing and to fit within said casing in a fluid tight manner while capable of longitudinal movement relatively thereto, a boss or projection fixed to said casing extending inwardly therefrom to said drum-like body and there blocking the annular chamber throughout its length, a motive fluid admission conduit at one side of said boss or projection, a motive fluid exhaust conduit at the other side of said boss or projection, sets of spring pressed packing bars adapted to make fluid tight joints between said boss or projection and said body and said piston like collars or partitions each set comprising three bars arranged at right angles to each other connected by tenon wedges, and piston blades carried in the recesses of said body.

2. In a rotary motor, a cylindrical casing a rotary shaft extending centrally through said casing, a drum like body formed with recesses carried by said shaft within said casing and concentrically arranged in relation to said shaft, piston like collars or partitions on said shaft adapted to form the ends of the annular chamber formed between said body and said casing packing rings on said collars or partitions adapted to work in a fluid tight manner in said casing, a boss or projection fixed to said casing extending inwardly therefrom to said drum like body and there blocking the annular chamber throughout its length, a motive fluid admission conduit at one side of said boss or projection, a motive fluid exhaust conduit at the other side of said boss or projection, spring pressed packing bars adapted to make fluid tight joints between said boss or projection and said body and said piston like collars or partitions, piston blades carried in the recesses of said body, and spring pressed packing blocks mounted in said piston like collars or partitions and extending between the outer faces thereof and said packing rings adjacent thereto.

3. In a rotary motor, a cylindrical casing, a rotary shaft extending centrally through said casing, a drum like body formed with recesses carried by said shaft within said casing and concentrically arranged in relation to said shaft, piston like collars or partitions on said shaft adapted to form the ends of the annular chamber formed between said body and said casing and to fit within said casing in a fluid tight manner while capable of longitudinal movement relatively thereto, means for admitting and exhausting motive fluid to and from said annular chamber, piston blades carried in the recesses of said body, means for admitting motive fluid into the recesses of said body behind said piston blades, end packing strips carried by said piston blades adapted to be forced by motive fluid toward the ends of the recesses of said body, springs also forcing said strips outwardly, spring pressed plates carried by the end portions of said piston blades at the rear sides thereof and adapted to be forced by the motive fluid against the adjacent walls of the recess, and means for forcing the advancing faces of said piston blades against the corresponding walls of the recesses of the drum-like body.

4. In a rotary motor, a cylindrical casing having a boss provided with inlet and outlet ports extending into said casing, a revoluble shaft provided with piston collars and a piston-carrying drum between said collars, radially reciprocating pistons in said drum, spring-pressed members carried by said boss bearing against said drum and piston collars, and spring-pressed blocks on said collars for cutting off communication between said inlet and outlet ports.

5. In a rotary motor, the combination of a cylindrical casing having side openings, a revoluble shaft having piston collars fast thereto and adapted to slide into said casing, bosses fitting said side openings having inlet and outlet ports, and provided with spring-pressed packing bars, piston-carrying drums between said collars bearing against said bars and conduits for conducting fluid from the exhaust side of one set of pistons to the working side of another set of said pistons.

Signed at Paris, France this twenty-second day of January 1908.

MAURICE NAËDER.

Witnesses:
HANSON C. COXE,
MIGUEL ZEROLO.